United States Patent
Shams et al.

(10) Patent No.: US 10,887,642 B1
(45) Date of Patent: Jan. 5, 2021

(54) MANAGING ENCODER CONFIGURATION BASED ON CONTENT DELIVERY NETWORK PERFORMANCE

(71) Applicant: Amazon Technologies, Inc., Seattle, WA (US)

(72) Inventors: Khawaja Shams, Portland, OR (US); James Ka Sin Au, Richmond (CA); John Saxton, Portland, OR (US); Mathew Jack, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/453,828

(22) Filed: Jun. 26, 2019

(51) Int. Cl.
*H04N 7/173* (2011.01)
*H04N 21/2662* (2011.01)
*H04N 21/239* (2011.01)
*H04N 21/6379* (2011.01)

(52) U.S. Cl.
CPC ..... *H04N 21/2662* (2013.01); *H04N 21/2393* (2013.01); *H04N 21/6379* (2013.01)

(58) Field of Classification Search
CPC ........... H04N 21/2662; H04N 21/2393; H04N 21/6379
See application file for complete search history.

(56) References Cited

U.S. PATENT DOCUMENTS

| 9,071,484 | B1* | 6/2015 | Truax ................ H04L 29/06027 |
| 10,498,655 | B1* | 12/2019 | Nitzan .................... H04L 47/30 |
| 2007/0076693 | A1* | 4/2007 | Krishnaswamy ....... H04L 47/10 370/352 |
| 2015/0288733 | A1* | 10/2015 | Mao ...................... H04L 65/602 709/219 |
| 2018/0198818 | A1* | 7/2018 | Andrews ................ H04L 65/80 |
| 2018/0295063 | A1* | 10/2018 | Flores ................ H04L 41/5025 |
| 2018/0309840 | A1* | 10/2018 | Zachman .............. H04L 65/602 |

* cited by examiner

*Primary Examiner* — Kyu Chae
(74) *Attorney, Agent, or Firm* — Nicholson De Vos Webster & Elliott LLP

(57) ABSTRACT

Techniques for managing encoder configuration based on content delivery network performance are described. A computer-implemented method may include obtaining availability metrics from one or more content delivery networks (CDNs), the availability metrics associated with one or more content streams provided by the one or more CDNs, determining at least one CDN has less than a threshold capacity based at least on the availability metrics, and sending a request to one or more encoders associated with the one or more content streams to reduce a quality of at least one of the one or more content streams based at least on the availability metrics.

18 Claims, 8 Drawing Sheets

MANAGING ENCODER CONFIGURATION BASED ON CONTENT DELIVERY NETWORK PERFORMANCE

BACKGROUND

Computing devices can be connected together via communication networks to enable the exchange of data between the computing devices. For example, a client computing device can request content, such as a web page, video, audio, or other content, from a server computing device over a communication network, such as the Internet. The server computing device may provide the content to the client computing device directly or by using one or more content delivery network (CDN) service providers. CDN service providers may provide requested content to client computing devices over a communication network. Content providers may use multiple CDN service providers that may be spread geographically, and which may respond to requests from client computing devices in the same or nearby geographic regions.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for managing encoder configuration based on content delivery network (CDN) performance Managing CDN capacity can be a challenge in content delivery environments. Each customer (e.g., content provider) can reserve CDN capacity to distribute its content. However, because new capacity cannot be easily provisioned on-demand, the reserved capacity needs to be carefully managed. If the reserved capacity is exceeded, quality may be reduced across all streams in the CDN and/or some streams may be dropped, reducing the overall user experience.

According to some embodiments, feedback, such as capacity and availability metrics, from one or more CDNs may be provided to one or more encoders, which enables the encoders to make rate control decisions based on these metrics in real-time. Content may be encoded using constant bitrate (CBR), variable bitrate (VBR), or quality variable bitrate (QVBR) techniques. Unlike CBR, VBR allows for a higher bitrate to be used in more complex segments of content, while a lower bitrate can be used in less complex segments, so long as an average bitrate is met. QVBR allows for operators to provide a maximum bitrate and a quality parameter that indicates how aggressively the bitrate can be reduced during low complexity segments, this provides an increased savings of distribution and storage costs for the content. An encoder can encode one or more QVBR streams based on the quality parameter with the bitrate capped by the maximum bitrate parameter. Embodiments can reduce quality of targeted content streams, CDNs, etc. based on feedback received from the CDNs. For example, particular streams provided by a content provider may have their bitrates reduced, their maximum bitrate reduced, or their quality parameter lowered, to reduce the bandwidth consumption of the streams. This enables bandwidth consumption to be managed by focusing the quality reduction on the fewest possible streams, and therefore affecting the fewest possible viewers, rather than reducing the quality of all streams. Additionally, unlike past systems that required manually reducing the quality of streams after it has been determined that a CDN is near or over capacity, these quality reductions may be performed automatically in response to performance data obtained about the CDNs.

Figure 1:
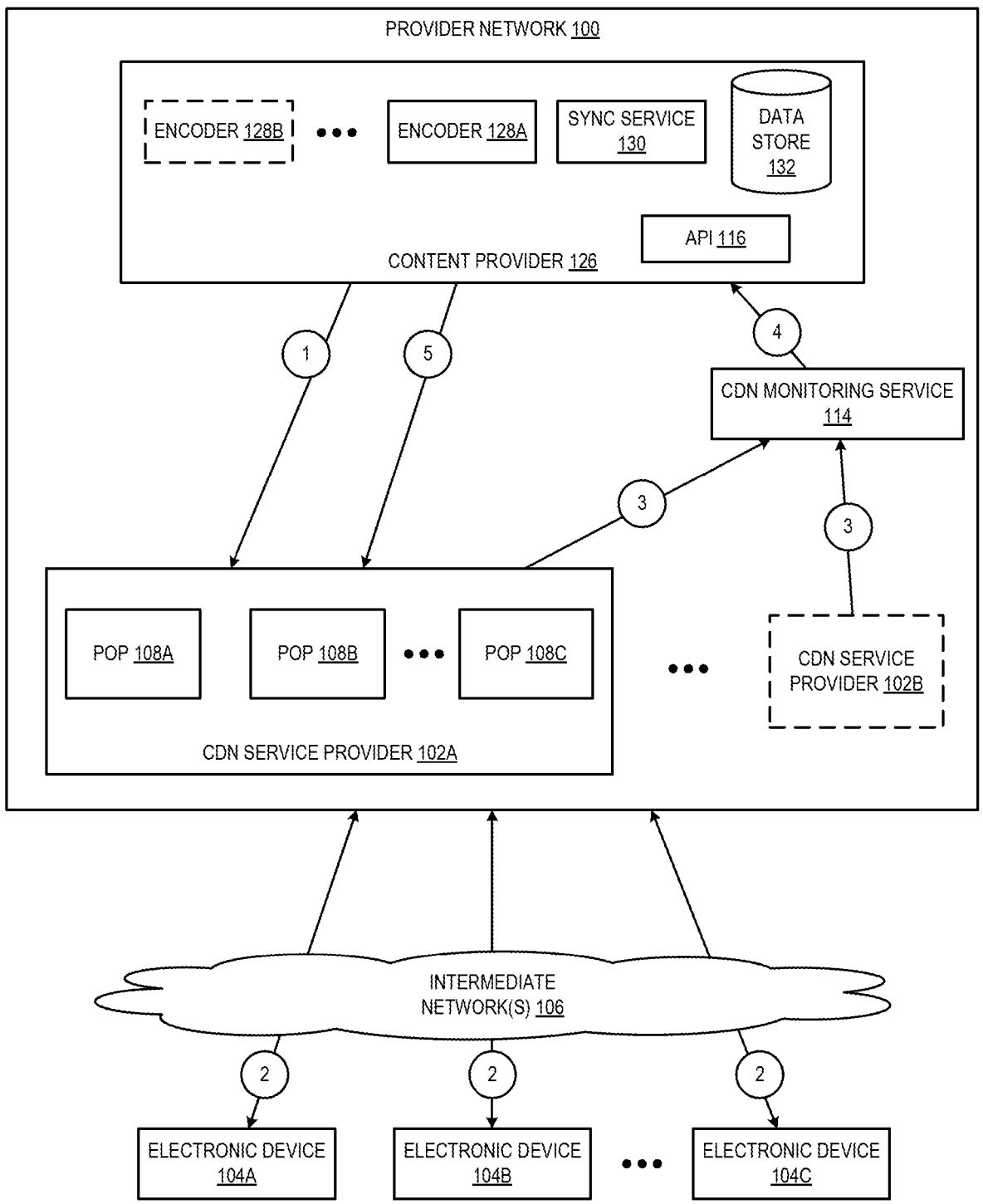
FIG. 1 is a diagram illustrating an environment for managing encoder configuration based on content delivery network (CDN) performance according to some embodiments.

FIG. 1 is a diagram illustrating an environment for managing encoder configuration based on content delivery network (CDN) performance according to some embodiments. The content delivery environment illustrated in FIG. 1 may include a plurality of electronic devices 104A-104C utilized by individual users, generally referred to as client computing devices, to request streaming or download content from one or more content delivery network service provider 102A-102B in provider network 100. As shown at numeral 1, a CDN service provider 102A may receive source content, such as source video content (e.g., live streaming video content, file-based video-on-demand video content, etc.) from one or more content providers 126. Though FIG. 1 depicts content provider 126 as being part of provider network 100, CDN service providers 102A-102B may additionally, or alternatively, receive content from external content providers which are not part of provider network 100. External content providers may separately host their content and provide it to the CDN service providers in provider network 100 over one or more intermediate networks, such as the Internet, to be distributed to users, such as the users of electronic devices 104A-104C.

A content provider 126 can include a plurality of encoders 128A-128B for generating multiple encoded streams for transmission to the CDN service providers. In some embodiments, the content provider 126 can further include synchronization services 130 for generating synchronization information utilized by the encoders 128A-128B, such as sequence numbers corresponding to the set of encoded segments, time stamp information related to a relative time of the encoded segments or from which relative time of encoded segments will be based, and the like. Each encoder may include an interface through which it can accept commands to change its rate control algorithm. These commands may include application programming interface (API) commands, which may cause the encoder to, e.g., reduce a cap bitrate, reduce a target bitrate, reduce a quality parameter and/or a maximum bitrate associated with a QVBR encoded stream, etc. The content provider 126 can further include a data store 132 for maintaining encoded data for transmission. The content provider can generate multiple renditions of content, such as a baseline rendition corresponding to a lowest encoded bitrate, and then one or more higher bitrate renditions. For example, a content provider may provide a 1080p content stream having a baseline rendition of 2 mbps, and higher bitrate renditions of 4 mbps, 6 mbps, etc. At least a subset of the renditions may be made available to the electronic device 104A-104C responsive to a request for a particular encoded bitrate version and format.

Generally, a content provider can generate a catalog identifying the video segments and encoded bitrates for each identified video segment. The catalog can be written into a manifest file that is provided to individual computing devices that have requested the video file. The electronic devices, through a respective software application, can request individual video segments according to the available encoded bitrates and formats as published in the manifest file. In some embodiments, the manifest may be a text file (e.g., JSON, XML, etc.) that describes where upcoming segments of the video content are located (e.g., paths, or other address information for each segment of the content). The manifest can indicate the bitrates of the available renditions. Each player may periodically request the manifest to identify any new segments to be loaded. For example, in a live broadcast, an encoder may append segments to the manifest as they are encoded.

As shown at numeral 2, the electronic devices can receive content from the CDN service providers over intermediate networks 106 (e.g., the Internet, a personal area network, local area network, wide area network, cable network, fiber network, satellite network, cellular telephone network, data network, or combination thereof) using various communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), etc. The electronic devices may include various computing devices, such as a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, etc. Each electronic device 104A-104C may optionally include one or more data stores including various applications or computer-executable instructions, such as web browsers or media player software applications, used to implement the embodiments disclosed herein.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet, a personal area network, local area network, wide area network, cable network, fiber network, satellite network, cellular telephone network, data network, or combination thereof) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In some embodiments, a CDN service provider 102A may include multiple edge locations from which a user device can request content. Individual edge locations may be referred to herein as a point of presence ("POP"), where a POP 108A-108C is intended to refer to any collection of related computing devices utilized to implement functionality on behalf of one or many content providers. POPs may be associated with a specific geographic location in which the computing devices implementing the POP are located, or with a region serviced by the POP. As illustrated in FIG. 1, in some embodiments the POP 108 can include one or more media processing components for processing encoded content streams received from content provider 126. The CDN service provider 102A may include multiple POPs 108A-108C located in different geographic locations so that user devices can communicate with a nearby a POP to retrieve content, thereby reducing the latency of delivering the requested content.

As discussed, customers typically reserve capacity across CDNs 102A-102B to distribute content to electronic devices 104A-104C. This reservation may be made based on a forecast of viewership for the content. For example, a zero buffer rate (e.g., a percentage of viewers which do not experience any buffering during the playback of content) may be measured for an area of the provider network, particular CDN, particular POP of a particular CDN, etc., from a previous distribution (e.g., a large event). In some embodiments, the ZBR may indicate types of viewers (e.g., by device types, what bitrates were consumed, etc.) did and did not experience buffering during the previous distribution. This can then be used to determine what bitrates should be advertised for the next comparable distribution and/or which bitrates should be advertised to particular device types. Forecasts, however, may be inaccurate, which combined with an inability to easily provision additional CDN capacity on demand, leads to the need to effectively manage the reserved CDN capacity. For example, if viewership greatly exceeds forecast demand, the overall viewer experience may be poor, as the content may become inaccessible or quality may be dropped significantly. As shown at numeral 3, embodiments use a CDN monitoring service 114 to obtain performance metrics of the CDN service providers 102A-102B and use the performance metrics to selectively reduce bandwidth consumption when CDN capacity is at or near its reserved limits.

CDN monitoring service 114 can maintain data indicating provisioned CDN capacity for the one or more CDN service providers by each customer (e.g., content provider 126). The CDN monitoring service can also obtain real-time performance metrics from each CDN service provider. These metrics may include real-time bandwidth consumption (e.g., peak bandwidth consumption) which may indicate overall bandwidth consumption or more granular metrics, such as bandwidth consumption per rendition. These metrics may also include a zero buffer rate (ZBR) for an area of the provider network, particular CDN, particular POP of a particular CDN, etc., where the ZBR indicates a percentage of viewers which do not experience any buffering during the playback of content. As discussed, at numeral 4, the CDN monitoring service 114 can send a request to one or more of the encoders 128A-128B at content provider 126 to reduce the quality of one or more renditions provided by the encoders based on the performance metrics associated with the CDNs. In some embodiments, the content provider can expose an API 116 through which such requests may be sent from the CDN monitoring service to the content provider. The requests may include API requests to, e.g., change the encoder's rate control algorithm. This may include adjusting a target rate of one or more of the renditions made available by the encoder, reducing a cap rate of one or more of the renditions made available by the encoder, reduce the quality level of a QVBR encoding, etc.

In some embodiments, an API request may identify one or more renditions (e.g., using an identifier associated with each of the one or more renditions) and a percentage or absolute change in the target bitrate. For example, an API request may be to reduce "Rendition A" (or other rendition identifier) by N %. In some embodiments, the API request may be to reduce the target bitrates of all renditions provided by a particular encoder. For example, an API request may be to reduce all bitrate targets by N %". In some embodiments, the API requests can be used to set specific bitrate targets, and may include a bitrate value to set as the target bitrate for a rendition (e.g., set "Rendition A" to bitrate N). In some embodiments, where one or more QVBR renditions are provided, the API can request can include one or more QVBR parameters to adjust, such as a quality parameter or maximum bitrate. Such API requests may specify a new quality parameter and/or maximum bitrate for a particular rendition, multiple renditions, or all renditions. As discussed, by reducing the QBVR quality parameter, the encoder can more aggressively reduce the bits used based on the complexity of the scene depicted in the rendition.

In some embodiments, CDN monitoring service can maintain global information indicating how much capacity has been reserved with each CDN by a given customer (e.g., content provider). The CDN monitoring service can obtain real-time performance data from each CDN that indicates the bandwidth consumption by each CDN associated with a content provider's streams. The CDN monitoring service can compare the bandwidth consumption to the reserved capacity and, if the bandwidth consumption is greater than a threshold value of the reserved capacity (e.g., 80%, 90%, 100%, greater than 100%, or other configurable value), then the CDN monitoring service can send a request to the content provider to adjust the renditions provided by the content provider. In some embodiments, the CDN monitoring service may request that the content provider reduce a cap bitrate of each rendition by an amount based on the current bandwidth consumption. In some embodiments, the CDN monitoring service may request that the content provider reduce a cap bitrate of the highest bitrate rendition by an amount based on the current bandwidth consumption.

In some embodiments, the CDN monitoring service can collect metrics for each rendition. For example, if an encoder is providing a 4K rendition, a 1080p rendition, and a 480p rendition, the CDN monitoring service may obtain bandwidth consumption metrics for each rendition. These metrics may indicate that a small number of users are streaming the 4K and 480p renditions, while a large number of users are streaming the 1080p rendition. As such, making changes to the bitrates of the 4K or 480p renditions will have a relatively small effect on the overall bandwidth consumption, whereas a bitrate reduction to the 1080p rendition will have a relatively large effect on the overall bandwidth consumption. Accordingly, the request to the content provider by the CDN monitoring service at numeral 4 may be to reduce the target bitrate (or QVBR quality setting, or capped bitrate, etc., depending on the encoding in use) of the 1080p rendition.

At numeral 5, the encoder(s) of content provider 126 can provide segments of content having the adjusted bitrate, reducing the overall bandwidth consumed by the CDN service providers. In some embodiments, the encoder may provide multiple 1080p (or other resolution) renditions. For example, three 1080p renditions may be provided having a 5 mbps bitrate, 3 mbps bitrate, and 1 mbps bitrate, respectively. The CDN monitoring service may obtain bandwidth consumption metrics that indicate that most viewers are streaming the 5 mbps and 3 mbps renditions and may request that the encoder reduce the bitrates of these renditions (e.g., to 4 and 2 mbps, respectively) to reduce overall bandwidth consumption. These bitrates may reflect target bitrates or capped bitrates associated with these renditions, depending on their encoding. In some embodiments, where the renditions are QVBR encodings, the quality parameter and/or the maximum bitrate may be reduced, enabling the bitrate to be more aggressively reduced based on the video complexity of the streams. In some embodiments, the encoder can push a new manifest to each player, the new manifest including lower bitrate segments in accordance with the request reduction in bitrate. In some embodiments, the encoder can change the address information in the manifest for each segment such that the manifest now points to lower bitrate segments rather than higher bitrate segments. This causes the players using the manifest to automatically load the lower bitrate segments, reducing the overall bandwidth consumption without forcing the players to reload or otherwise interrupt the user experience.

In some embodiments, an encoder may be implemented in provider network 100 or may be implemented as an appliance external to provider network 100. Such external encoders may experience network connectivity issues depending on, e.g., location, environmental conditions, local network capacity, etc. Each encoder may include a send buffer where encoded content segments are stored before being uploaded to, e.g., a CDN, storage location, or other upload location. The encoder may monitor its send buffer and, if it is determined to have reached a configurable capacity, then the encoder can determine that it does not have sufficient bandwidth to upload the content segments without risking running out of buffer capacity. The encoder may then dynamically reduce the bitrate at which it is encoding the content segments. This enables the encoder to store additional segments in the same size send buffer by reducing the storage size of each segment.

In some embodiments, the CDN monitoring service may request that the quality of one or more renditions be increased, based on availability metrics. For example, if the network has an excess of available bandwidth and players have sufficient forward buffers to prevent buffering of the renditions, the CDN monitoring service may send a request to increase the bitrates of one or more renditions or increase the quality parameters associated with one or more renditions. In some embodiments, the CDN monitoring service can reduce the quality of one or more renditions based on current network conditions and later increase the quality of the one or more renditions if and when the network conditions improve.

In some embodiments, the CDN monitoring service can select one or more renditions to reduce the quality of based on which renditions are likely to see the most noticeable quality differences to an end user. For example, the CDN monitoring service can preferentially reduce a 4K rendition to a 1080p rendition over reducing a high definition rendition to a standard definition rendition.

Figure 2:
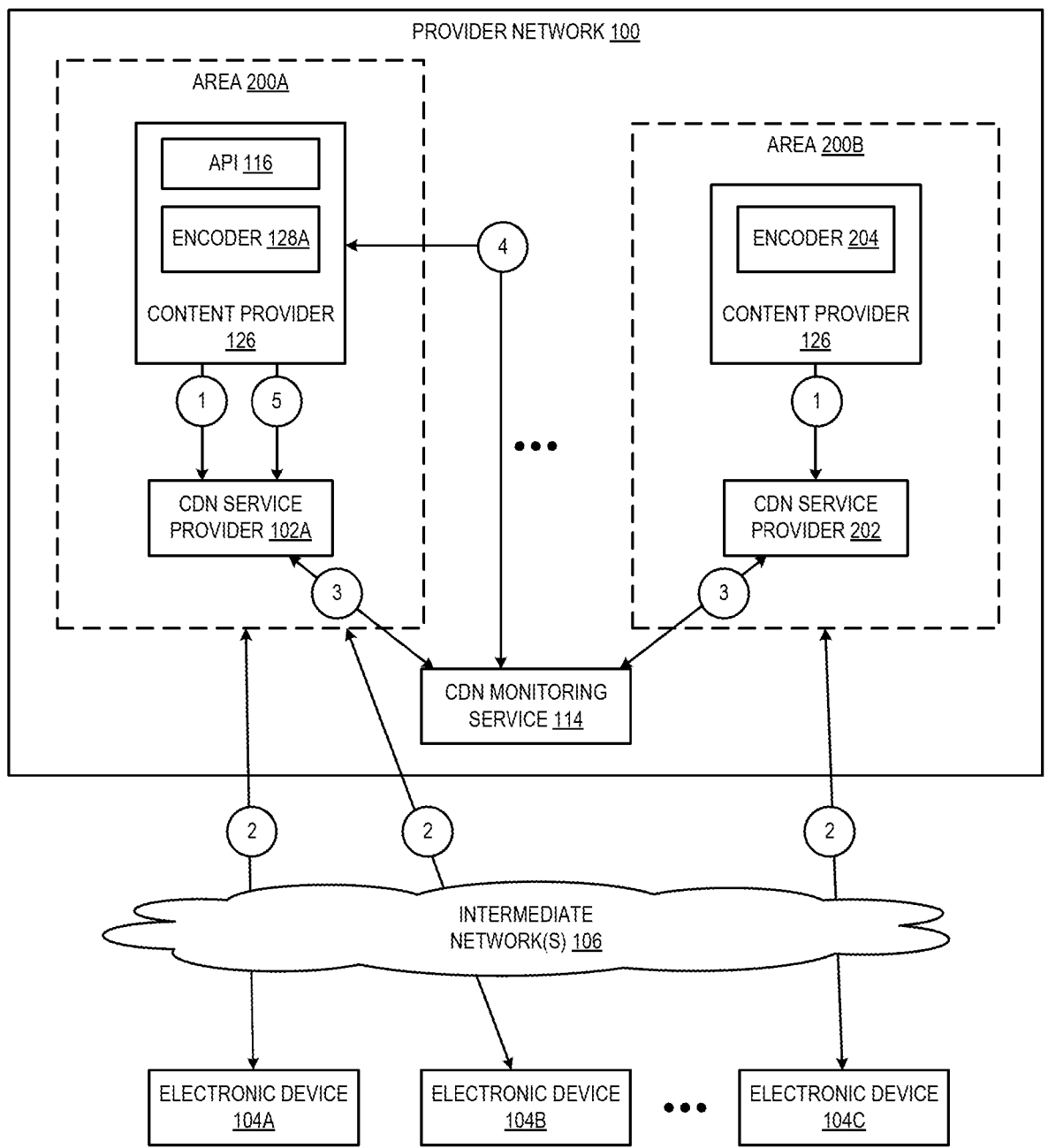
FIG. 2 is a diagram illustrating an environment for managing encoder configuration based on CDN performance in multiple areas of a provider network according to some embodiments.

FIG. 2 is a diagram illustrating an environment for managing encoder configuration based on CDN performance in multiple areas of a provider network according to some embodiments. As shown in FIG. 2, a provider network 100 may make available various resources to users. For example, in FIG. 2, provider network 100 includes multiple areas 200A and 200B. Each area may be logically isolated from the other (and from any other areas not shown within provider network 100). For example, each area may be a distinct logical data center, supported by one or more physical data centers, and each area may have its own power supply and networking infrastructure to limit the likelihood of a failure in one area from affecting another area. In various embodiments, provider network 100 may include a plurality of regions, each having its own plurality of areas. Each region of provider network 100 may include resources located in the same geographic area (e.g., state, country, etc.). By dividing provider network 100 into various regions and areas, the data and customer instances stored therein can be protected against failure events. For example, a failure in a first area may not impact the resources in a second area. Likewise, a failure in one geographic region may not affect resources located in another geographic region. Additionally, by locating resources in the same geographic areas as users of those resources, latency and other network performance may be improved.

In the embodiment shown in FIG. 2, a content provider 126 may have resources in multiple areas, such as one encoder 128A in area 200A and a second encoder 204 in area 200B. At numeral 1, each encoder may make available renditions of content that can be accessed through CDNs 102A, 202 located in the respective areas. Electronic devices 104A-104C may request content from a CDN, as shown at numeral 2. In some embodiments, the requests may be received by a front-end (not shown) which redirects the request to a CDN in an area of provider network 100 closest to the requesting device. For example, electronic devices 104A and 104B may be located in the East Coast of the United States of America, and their requests may be redirected to an endpoint associated with CDN service provider 102A, located in the East Coast of the USA. Similarly, electronic device 104C may be located in the West Coast of the USA and may be redirected to an endpoint associated with CDN service provider 202, located on the West Coast of the USA. This both distributes the load of requests and streaming services to multiple CDNs and generally improves performance by servicing requests using resources located geographically nearer the requesting devices.

As shown in FIG. 2, CDN monitoring service 114 can monitor CDN service providers in multiple areas of the provider network 100, as shown at numeral 3. The CDN monitoring service can be a distributed service, with instances located in each area monitoring any co-located CDNs. Additionally, or alternatively, CDN monitoring service 114 may be implemented in a third area (not shown) of the provider network and can monitor the CDNs of other areas of the provider network. The CDN monitoring service 114 can track, in real-time, what percentage of the content distribution is originating from each area origin. This enables the CDN to target a specific origin (e.g., encoder 128A or 200A) for bitrate reduction, rather than adjusting the bitrate of all of the encoders. As a result, bandwidth consumption can be reduced such that the quality reduction impacts a small number of end users. For example, CDN monitoring service 114 may determine that CDN service provider 102A is at or near capacity (e.g., above a bandwidth consumption threshold), while CDN service provider 202 has sufficient capacity to meet current demand (e.g., below a bandwidth consumption threshold). Accordingly, at numeral 4, the CDN monitoring service can send a request, such as an API request as discussed above, to encoder 128A in area 200A to reduce the bitrates of one or more renditions provided by the encoder. These reductions may be similar to those described above with respect to FIG. 1. At numeral 5, the encoder 128A can provide content segments having the reduced bitrates.

Figure 3:
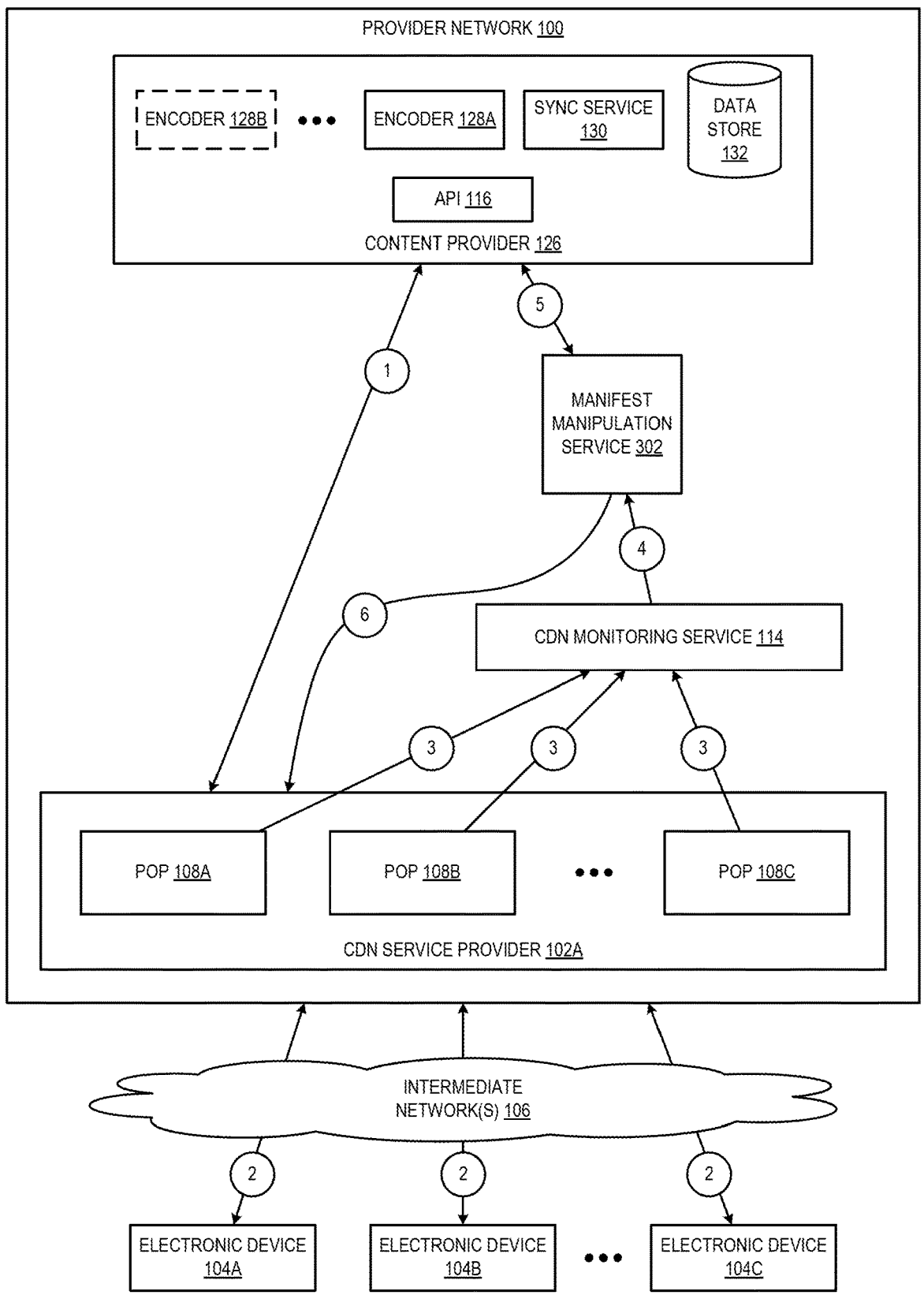
FIG. 3 is a diagram illustrating an environment for managing encoder configuration for particular viewers based on CDN performance according to some embodiments.

FIG. 3 is a diagram illustrating an environment for managing encoder configuration for particular viewers based on CDN performance according to some embodiments. As shown in FIG. 3, and similar to the examples described above with respect to FIGS. 1 and 2, a content provider 126 can provide one or more renditions of content to a CDN service provider, as shown at numeral 1. The CDN service provider may make the renditions available to one or more electronic devices 104A-104C, as shown at numeral 2. As discussed, a CDN may include a plurality of POPs 108A-108C. Each POP may have its own associated capacity which may be reserved by particular content providers for particular content distributions.

As shown at numeral 3, the CDN monitoring service 114 may be configured to monitor each POP of a CDN. In some embodiments, each POP can provide its capacity on a per distribution basis to CDN monitoring service 114. Each POP may include a request to the CDN monitoring to reduce the quality of one or more distributions for the POP. For example, the POP may include an HTTP Header that includes an identifier associated with a distribution and a value indicating whether to increase quality or reduce quality (e.g., any positive value indicates an increase in quality while any negative value indicates a reduction in quality). In some embodiments, it may be desirable to reduce the quality of a content distribution by one customer (e.g., content provider) because it is impacting the bandwidth available to distributions by other providers via a particular POP.

At numeral 4, the CDN monitoring service can send a request to the manifest manipulation service to reduce the quality of one or more renditions being provided to a particular POP and/or a particular viewer connected to the POP. In some embodiments, the request may include the capacity information provided by the POP and/or requests from the POP to increase or reduce the quality of one or more renditions for particular content providers' distributions. At numeral 5, the manifest manipulation service 302 can service the request by requesting lower quality segments to provide to the POP. For example, the manifest manipulation service may request more a QVBR encoding with a lower quality parameter and/or maximum bitrate, or may reduce the cap bitrate or targeted bitrate of one or more renditions, depending on the encoding in use.

At numeral 6, the manifest manipulation service 302 can advertise the lower quality segments to the CDN, a particular POP, and/or particular viewers connected to a POP. In some embodiments, the manifest manipulation service 302 can advertise only a subset of renditions that are provided by an encoder. For example, the manifest manipulation service can remove high bitrate renditions or overwrite the references to the high bitrate segments with references to lower bitrate segments. In some embodiments, a live encoder can produce multiple renditions and the manifest manipulation service may select one to advertise. For example, an encoder may provider two 1080p renditions, one having a bitrate of 5 mbps and a second having a bitrate of 4 mbps. If the CDN monitoring service 114 determines that a POP is at or near capacity, the manifest manipulation service may advertise the lower bitrate rendition instead of the higher bitrate rendition. could take a large set of encodes, then advertise a smaller set of encodes to viewers. In some embodiments, the manifest manipulation service can advertise different manifests to different players, which enables particular electronic device types to receive specific encode types (e.g., QVBR encodes may be provided specifically to iOS 8+ devices). For example, an encoder may create a plurality of encodes, a subset of which are compatible with, or optimized for, a particular device type. When a request is received from a player, the manifest manipulation service can identify the device type based on the request, and provide the subset of encodes to the player. By using the manifest manipulation service to change the advertised renditions, the streams provided to particular players or regions may be controlled, rather than reducing the quality of the content provided to all players from a particular encoder, CDN, or POP.

In some embodiments, a player on an electronic device connected to the POP can advertise a status associated with its forward looking buffer. Each player can include a forward looking buffer in which upcoming segments are stored. This buffer allows the player to continue streaming in the event of any transient connection issues that do not affect the player longer than it has buffered segments. For example, the forward looking buffer may store a configurable number of seconds worth of segments. If the player has a six second buffer, and each segment is two seconds long, then the buffer may include three segments. If the player determines that its buffer has less than a configurable number of seconds of content buffered, then it can send a request to the manifest manipulation service 302 to receive lower bitrate data until the buffer has been filled. In some embodiments, the request may be passed from the electronic device on which the player is executing to the POP to which the electronic device is connected. The POP may pass the request directly to the manifest manipulation service 302 or it may pass the request to the CDN monitoring service when it advertises its current capacity. The CDN monitoring service can then submit the request to the manifest manipulation service. The manifest manipulation service can request lower bitrate segments from the content provider and thereafter advertise the lower bitrate segments to the requesting player and/or POP. For example, the manifest manipulation service can replace references to the higher bitrate segments with references to the lower bitrate segments in the manifest provided to the player and/or POP. This enables the quality to be reduced to only the player that reported the low buffer, or to the entire POP to which the viewer is connected (e.g., in case the player's low buffer is indicative of a POP-wide issue).

In some embodiments, the lower bitrate segments may be provided temporarily to the player by the manifest manipulation service. For example, once the buffer has been refilled, the player may resume obtaining segments having the higher bitrate. This can lead to an issue where a particular player is periodically requesting lower bitrate segments due to a persistent connection issue, which can lead to a poor user experience as the bitrate of the content repeatedly changes. In some embodiments, the manifest manipulation service can keep track of requests from players for lower bitrate segments. If the requests are received greater than a threshold number of times in a given time period, then the manifest manipulation service can permanently provide the player with a lower bitrate feed. For example, the manifest manipulation service can update the pointers of all of the segments in the manifest used by the viewer to lower bitrate segments.

In some embodiments, the manifest manipulation service can request an encoder to dynamically add another rendition. For example, the CDN monitoring service may determine that players connected to a CDN or a particular POP of a CDN, are consistently consuming one rendition provided by the content provider, and that the players consistently have full forward looking buffers, then it can be determined that there is sufficient capacity to add another rendition. For example, if the content provider initially provides a master manifest with 5 mbps, 3 mbps, and 1mbps renditions, and a large portion of players are consuming the 1 mbps rendition, then it may be determined that the higher renditions are too high, and that another rendition can be added between the 3 mbps and the 1mbps renditions. The manifest manipulation service can request the new rendition be added by the encoder to the master manifest. Because existing viewers typically do not retrieve a new master manifest during playback, the higher quality rendition may only be available to new players that request the content. This enables the content provider to provide a rendition that is optimized for the highest average quality being consumed.

In some embodiments, different players may support different features. For example, a player based on an Android platform may support different features from a player based on an iOS platform. When a player requests a master manifest (e.g., through an HTTP GET message, or other message), the request can include a user agent identifier (e.g., a string) which indicates the type of device on which the player is running. The manifest manipulation service can provide the player with one or more renditions that are compatible with, or optimized for, the features provided by that type of device. This may include different encoding techniques, bitrates, or other features that are specific to the type of device that requested the rendition.

Figure 4:
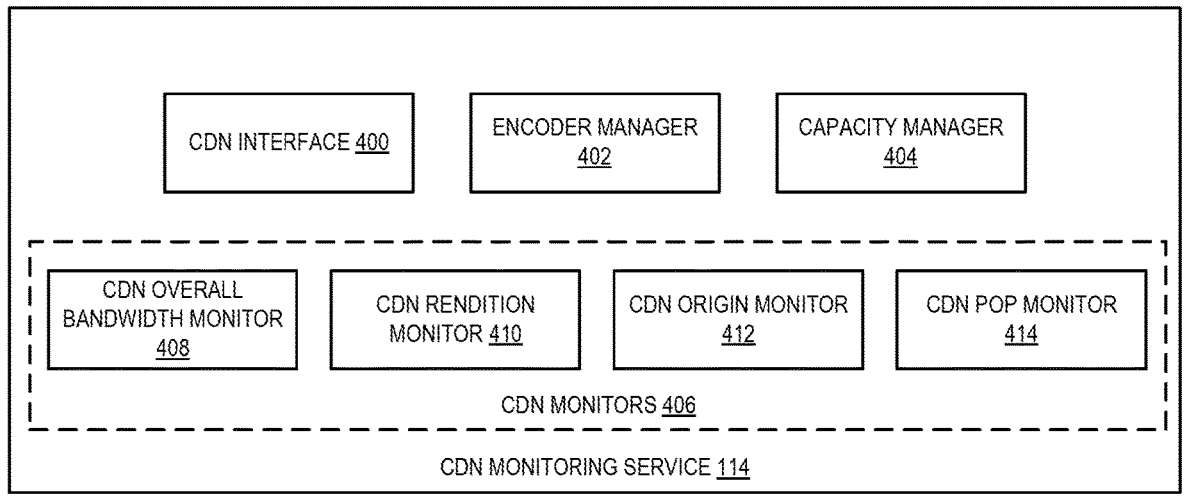
FIG. 4 is a diagram illustrating a CDN monitoring service according to some embodiments.

FIG. 4 is a diagram illustrating a CDN monitoring service according to some embodiments. As shown in FIG. 4, the CDN monitoring service 114 may include one or more CDN interfaces 400 through which the CDN monitoring service 114 can connect to various CDNs and/or POPs in a particular CDN. The CDN interface may enable the CDN monitoring service to subscribe to metrics being published by the CDNs and/or POPs. The CDN monitoring service can further include an encoder manager 402. The encoder manager can maintain information about the reserved capacity associated with each encoder and/or customer (e.g., content provider). For example, the encoder manager may maintain a data structure that links each encoder and/or customer to an amount of capacity reserved at each CDN monitored by the CDN monitoring service. In some embodiments, the CDN monitoring service may also include a capacity manager 404 which may provide an indication of the real-time capacity of each CDN being monitored by the CDN monitoring service. The capacity manager 404 may indicate the current available overall capacity of a given CDN and/or the current available capacity for each customer of the CDN.

CDN monitoring service 114 may further include one or more CDN monitors 406. The CDN monitors 406 may include a CDN overall bandwidth monitor 408 which tracks the overall bandwidth consumption for each CDN being monitored. The CDN monitors may also include CDN rendition monitor 410, which may track the bandwidth consumption by each rendition in each CDN. CDN origin monitor 412 can track bandwidth consumption per origin (e.g., per encoder) across one or more areas of a provider network. CDN POP monitor can track bandwidth consumption by each POP in each CDN being monitored. As discussed above, a given CDN monitoring service may include one or more of these monitors, depending on implementation, to enable the CDN monitoring service to monitor bandwidth consumption at different granularities.

Figure 5:
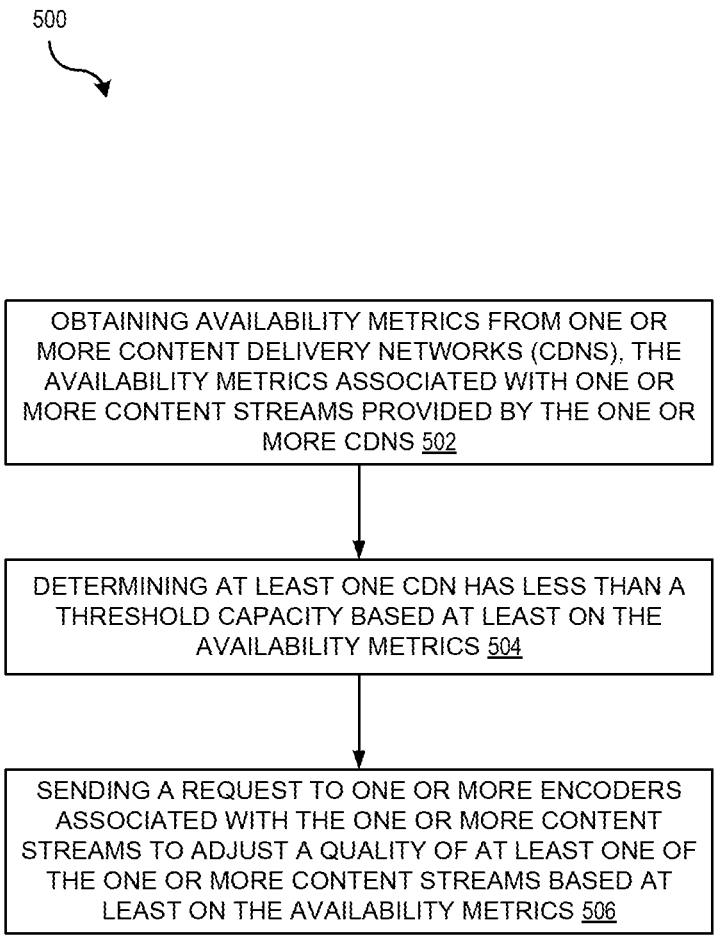
FIG. 5 is a flow diagram illustrating operations of a method for managing encoder configuration based on CDN performance according to some embodiments.

FIG. 5 is a flow diagram illustrating operations of a method for managing encoder configuration based on CDN performance according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by CDN monitoring service 114, encoders 128A, 128B, 204, POPs 108A-108C, manifest manipulation service 302, etc. of the other figures.

The operations 500 include, at block 502, obtaining availability metrics from one or more content delivery networks (CDNs), the availability metrics associated with one or more content streams provided by the one or more CDNs. In some embodiments, the availability metrics from the one or more CDNs include real-time bandwidth consumption of a plurality of points of presence (POPs) associated with each CDN of the one or more CDNs. In some embodiments, the availability metrics include one or more of zero buffer rate, real-time capacity, or real-time bandwidth consumption.

The operations 500 further include, at block 504, determining at least one CDN has less than a threshold capacity based at least on the availability metrics. In some embodiments, determining at least one CDN has less than a threshold capacity based at least on the availability metrics may further comprise identifying a first encoder associated with a first CDN in a first area of a provider network and a second encoder associated with a second CDN in a second area of the provider network, and determining the first CDN has less than the threshold capacity.

The operations 500 further include, at block 506, sending a request to one or more encoders associated with the one or more content streams to adjust a quality of at least one content stream of the one or more content streams based at least on the availability metrics. In some embodiments, sending a request to one or more encoders associated with the one or more content streams to adjust a quality of at least one of the one or more content streams based at least on the availability metrics, may further comprise sending a request to reduce a bitrate associated with each of the one or more content streams. In some embodiments, sending a request to an encoder associated with the one or more content streams to adjust a quality of at least one of the one or more content streams based at least on the availability metrics, may further comprise sending a request to reduce the quality of the one or more content streams to the first encoder associated with the first area of the provider network.

In some embodiments, the operations may further include identifying the at least one of the one or more content streams based at least on a bandwidth consumption associated with the at least one of the one or more content streams. In some embodiments, the operations may further include receiving a request to reduce a bitrate of a first content stream received by a player connected to a first POP, and sending a request to a manifest manipulation service to reduce the bitrate of the first content stream, the request identifying the first content stream and the player, wherein the manifest manipulation service overwrites references to one or more segments in a manifest file to one or more lower bitrate references and sends the manifest file to the player. In some embodiments, the manifest manipulation service sends a request to the one or more encoders to dynamically add a new content stream, the new content stream having a bitrate different from the one or more content streams, and wherein the manifest manipulation service updates the manifest file to include references to the new content stream. In some embodiments, the manifest manipulation service identifies a device type associated with a player that has requested a content stream, and provides a subset of the one or more content streams that are compatible with the device type to the player.

In some embodiments, the operations may include generating, by an encoder of a content provider, a plurality of content renditions of source video content, each content rendition having a different bitrate, providing a manifest file identifying the plurality of content renditions to a content delivery networks (CDN), the CDN to provide the plurality of content renditions to a plurality of players on a plurality of electronic devices, obtaining availability metrics from the CDN, the availability metrics indicating real-time bandwidth consumption of the plurality of content renditions at the CDN, determining the CDN has less than a threshold capacity based at least on the availability metrics, and sending a request to the encoder to reduce a bitrate of at least one of the plurality of content renditions based at least on the availability metrics. In some embodiments, the request is to reduce a target bitrate of each of the plurality of content renditions based at least on the availability metrics. In some embodiments, the request is to reduce a target bitrate of a first content rendition of the plurality of content renditions based at least on the availability metrics, wherein the first content rendition is being streamed by a largest number of players of the plurality of content renditions.

Figure 6:
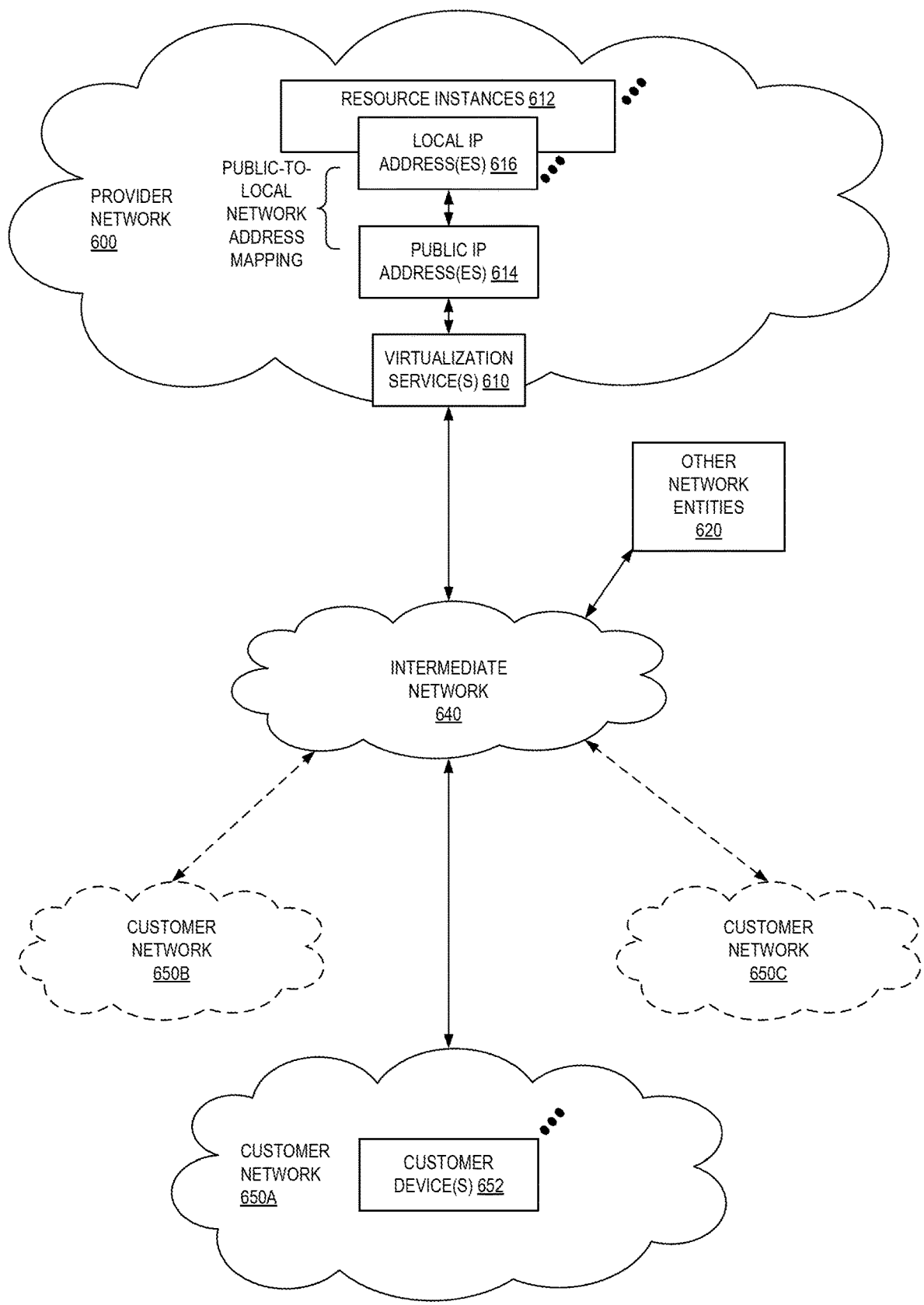
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
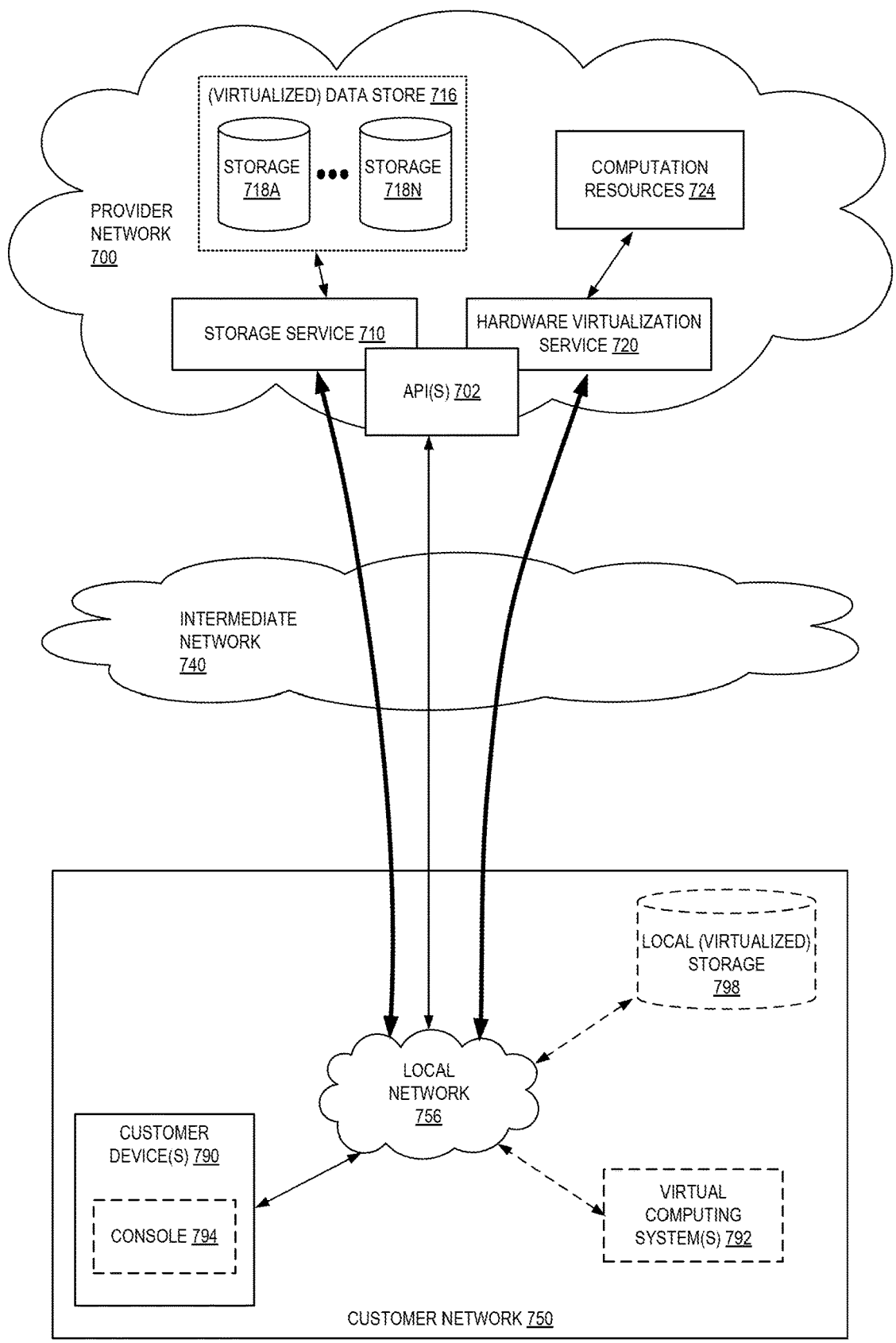
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
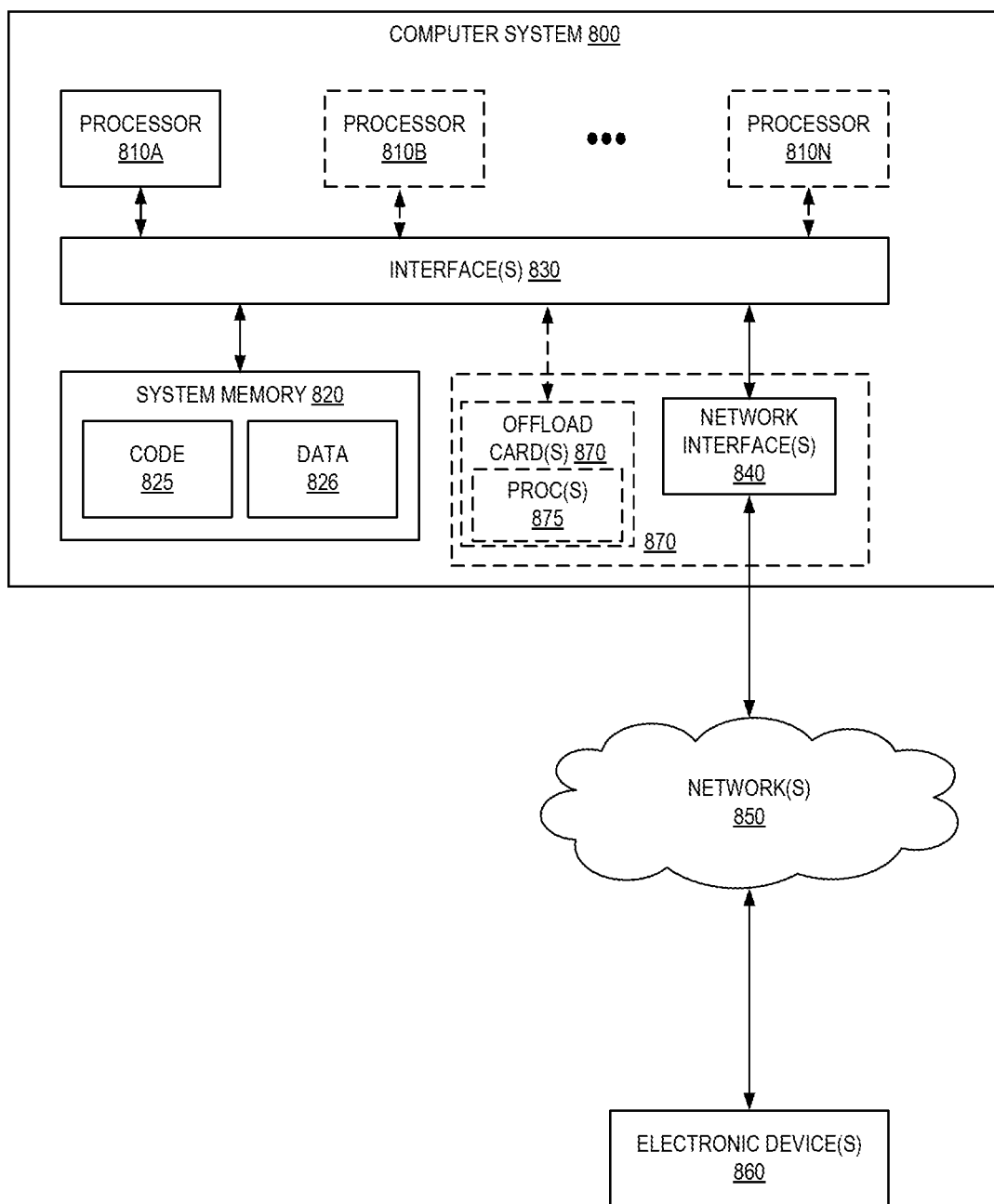
FIG. 8 is a block diagram illustrating an example computer system that may be used in some embodiments.

In some embodiments, a system that implements a portion or all of the techniques for managing encoder configuration based on content delivery network (CDN) performance as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A, 102B, 104A-104C, 128A, 128B, 200A, 200B, 718A-718N, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   generating, by an encoder of a content provider, a plurality of content renditions of source video content, each content rendition having a different bitrate;
   providing a manifest file identifying the plurality of content renditions to a content delivery network (CDN), the CDN to provide the plurality of content renditions to a plurality of players on a plurality of electronic devices;
   obtaining availability metrics from the CDN, the availability metrics indicating real-time bandwidth consumption of the plurality of content renditions at a plurality of points of presence (POPs) associated with the CDN;
   determining the CDN has less than a threshold capacity based at least on the availability metrics;
   sending a request to the encoder to adjust a bitrate of at least one of the plurality of content renditions based at least on the availability metrics;
   receiving, by the encoder, the request to adjust the bitrate of the at least one of the plurality of content renditions received by a player connected to a first POP, wherein the request to adjust is to reduce the bitrate of the at least one of the plurality of content renditions based at least on the availability metrics; and
   sending a request to a manifest manipulation service to reduce the bitrate of the at least one of the plurality of content renditions, the request identifying the at least one of the plurality of content renditions and the player, wherein the manifest manipulation service overwrites references to one or more segments in a manifest file to one or more lower bitrate references and sends the manifest file to the player.

2. The computer-implemented method of claim 1, wherein the request to adjust is to reduce a target bitrate of each of the plurality of content renditions based at least on the availability metrics.

3. The computer-implemented method of claim 1, wherein the request to adjust is to reduce at least one of a quality variable bitrate (QVBR) quality parameter or a maximum bitrate associated with at least one of the plurality of content renditions based at least on the availability metrics.

4. The computer-implemented method of claim 1, wherein the request to adjust is to reduce a target bitrate of a first content rendition of the plurality of content renditions based at least on the availability metrics including one or more of a zero buffer rate, real-time capacity, or real-time bandwidth consumption.

5. A computer-implemented method comprising:
   obtaining availability metrics from one or more content delivery networks (CDNs), the availability metrics associated with one or more content streams provided by the one or more CDNs, wherein the availability metrics from the one or more CDNs include real-time bandwidth consumption of a plurality of points of presence (POPs) associated with each CDN of the one or more CDNs;
   determining at least one CDN has less than a threshold capacity based at least on the availability metrics;
   sending a request to one or more encoders associated with the one or more content streams to adjust a quality of at least one content stream of the one or more content streams based at least on the availability metrics;

receiving a request to reduce a bitrate of a first content stream received by a player connected to a first POP; and sending a request to a manifest manipulation service to reduce the bitrate of the first content stream, the request identifying the first content stream and the player, wherein the manifest manipulation service overwrites references to one or more segments in a manifest file to one or more lower bitrate references and sends the manifest file to the player.

6. The computer-implemented method of claim 5, wherein sending a request to one or more encoders associated with the one or more content streams to adjust a quality of at least one of the one or more content streams based at least on the availability metrics, further comprises:

sending a request to reduce a bitrate associated with each of the one or more content streams.

7. The computer-implemented method of claim 5, further comprising:

identifying the at least one content stream based at least on a bandwidth consumption associated with the at least one of the one or more content streams.

8. The computer-implemented method of claim 5, wherein determining at least one CDN has less than a threshold capacity based at least on the availability metrics further comprises:

identifying a first encoder associated with a first CDN in a first area of a provider network and a second encoder associated with a second CDN in a second area of the provider network; and determining the first CDN has less than the threshold capacity.

9. The computer-implemented method of claim 8, wherein sending a request to an encoder associated with the one or more content streams to adjust a quality of at least one of the one or more content streams based at least on the availability metrics, further comprises:

sending the request to reduce the quality of the one or more content streams to the first encoder associated with the first area of the provider network.

10. The computer-implemented method of claim 5, wherein the manifest manipulation service sends a request to the one or more encoders to dynamically add a new content stream, the new content stream having a bitrate different from the one or more content streams, and wherein the manifest manipulation service updates the manifest file to include references to the new content stream.

11. The computer-implemented method of claim 5, wherein the manifest manipulation service identifies a device type associated with a player that has requested a content stream, and provides a subset of the one or more content streams that are compatible with the device type to the player.

12. The computer-implemented method of claim 5, wherein the availability metrics include one or more of zero buffer rate, real-time capacity, or real-time bandwidth consumption.

13. A system comprising:

one or more content delivery networks (CDNs) implemented by a first one or more electronic devices; and a CDN monitoring service implemented by a second one or more electronic devices, the CDN monitoring service including instructions that upon execution cause the CDN monitoring service to:

obtain availability metrics from the one or more content delivery networks (CDNs), the availability metrics associated with one or more content streams provided by the one or more CDNs, wherein the availability metrics from the one or more CDNs include real-time bandwidth consumption of a plurality of points of presence (POPs) associated with each CDN of the one or more CDNs;

determine at least one CDN has less than a threshold capacity based at least on the availability metrics;

send a request to one or more encoders associated with the one or more content streams to adjust a quality of at least one of the one or more content streams based at least on the availability metrics;

receive a request to reduce a bitrate of a first content stream received by a player connected to a first POP; and send a request to a manifest manipulation service to reduce the bitrate of the first content stream, the request identifying the first content stream and the player, wherein the manifest manipulation service overwrites references to one or more segments in a manifest file to one or more lower bitrate references and sends the manifest file to the player.

14. The system of claim 13, wherein the instructions to send a request to one or more encoders associated with the one or more content streams to adjust a quality of at least one of the one or more content streams based at least on the availability metrics, when executed, further cause the CDN monitoring service to:

send a request to reduce a bitrate associated with each of the one or more content streams.

15. The system of claim 13, wherein the instructions, when executed, further cause the CDN monitoring service to:

identify the at least one of the one or more content streams based at least on a bandwidth consumption associated with the at least one of the one or more content streams.

16. The system of claim 13, wherein the instructions to determine at least one CDN has less than a threshold capacity based at least on the availability metrics, when executed, further cause the CDN monitoring service to:

identify a first encoder associated with a first CDN in a first area of a provider network and a second encoder associated with a second CDN in a second area of the provider network; and determine the first CDN has less than the threshold capacity.

17. The system of claim 16, wherein the instructions to send a request to an encoder associated with the one or more content streams to adjust a quality of at least one of the one or more content streams based at least on the availability metrics, when executed, further cause the CDN monitoring service to:

send a request to reduce the quality of the one or more content streams to the first encoder associated with the first area of the provider network.

18. The system of claim 13, wherein the availability metrics from the one or more CDNs include real-time bandwidth consumption of a plurality of points of presence (POPs) associated with each CDN of the one or more CDNs.

* * * * *